UNITED STATES PATENT OFFICE.

CHARLES L. BORGMEYER, OF RAHWAY, NEW JERSEY.

MANUFACTURE OF PYROXYLINE COMPOUNDS.

SPECIFICATION forming part of Letters Patent No. 502,546, dated August 1, 1893.

Application filed May 13, 1893. Serial No. 474,113. (No specimens.)

*To all whom it may concern:*

Be it known that I, CHARLES L. BORGMEYER, a citizen of the United States, residing in the city of Rahway, county of Union, and State of New Jersey, have invented certain new and useful Improvements in the Manufacture of Compounds of Pyroxyline; and I do hereby declare that the following is a full, clear, and exact description of the invention, which will enable others skilled in the art to which it appertains to make and use the same.

I have discovered that oil of lemongrass, known scientifically as *Oleum andropogon citrati*, is a powerful active solvent of soluble pyroxyline, the solution yielding on drying or evaporation of the solvent, a clear, and under certain conditions of configuration, a flexible product, but especially well suited to the preparation of thin solutions of pyroxyline. I have found by trial that soluble pyroxyline dissolved to a plastic mass, or "converted," as known in the art, in oil of lemongrass, for which is required only a small proportion of the oil, can be afterward thinned or diluted with grain alcohol, acetate of amyl, fusel oil, or methyl alcohol, and with other known solvents and non-solvents of pyroxyline, to the condition required for a thin solution of pyroxyline, the operator selecting such diluting medium or media as will produce the required volatility and other conditions of the converted pyroxyline that will remain on evaporation of the solvent and of the diluents of the solution. I have also discovered by trial that, while the oil of lemongrass when diluted with an equal bulk of benzine will not properly dissolve and convert the pyroxyline, a mixture of equal bulks of methyl alcohol, benzine, and oil of lemongrass is a good and useful solvent of pyroxyline, and that these substances are miscible in these proportions to a clear solution which readily dissolves the pyroxyline.

I cannot state any advantage, other than its solvent action, to accrue in a pyroxyline compound from the use of oil of lemongrass as the solvent, such as water-repellent or cognate properties, because oil of lemongrass forms an emulsion with water and is not insoluble therein.

I find that a very fine lacquer can be made by dissolving one part of pyroxyline by weight in one part of oil of lemongrass by weight, and diluting the solution thus obtained with twenty parts, by weight, of acetate of amyl; and this solution may be diluted with grain alcohol.

Camphor can be employed in connection with oil of lemongrass, as with other active solvents, to obtain a plastic mass capable of being molded under heat and pressure, in ways well known in the art.

Having described my invention, what I claim, and desire to secure by Letters Patent, is—

1. A solvent for pyroxyline consisting of oil of lemongrass and an operative diluent which may be solvent or non-solvent of pyroxyline.

2. A solution of pyroxyline consisting of pyroxyline dissolved in oil of lemongrass.

3. A solution of pyroxyline consisting of pyroxyline dissolved in oil of lemongrass and an operative diluent which may be solvent or non-solvent of pyroxyline.

4. A solution of pyroxyline made in oil of lemongrass and diluted with acetate of amyl.

CHARLES L. BORGMEYER.

Witnesses:
DAVID D. CARNEY,
BYRON KLOTZ.